United States Patent
Saulce

[19]

[11] Patent Number: 6,113,130
[45] Date of Patent: Sep. 5, 2000

[54] MULTI-PURPOSE JOINTED SUSPENDED-BED TRANSPORT TRAILER

[76] Inventor: Roger Saulce, 443, rue Notre-Dame Est, Apt.# 1, Montréal, QC, Canada, H2Y 1C9

[21] Appl. No.: 09/140,764

[22] Filed: Aug. 26, 1998

[30] Foreign Application Priority Data

Aug. 27, 1997 [FR] France ................................. 9710915
Mar. 31, 1998 [CA] Canada ................................. 2,226377

[51] Int. Cl.$^7$ .................... B60P 1/00; B60P 1/02; B60T 3/00
[52] U.S. Cl. ............... 280/656; 280/43.18; 280/43.11; 414/482; 414/495; 188/32
[58] Field of Search ............... 280/656, 43.18, 280/43.11, 43.24, 47.23, 402; 414/442, 435, 482, 476, 436, 495, 917; 188/32

[56] References Cited

U.S. PATENT DOCUMENTS

| | | | |
|---|---|---|---|
| 2,905,481 | 9/1959 | Schramm | 280/43.11 |
| 3,199,889 | 8/1965 | Gadbury | 280/656 |
| 3,672,523 | 6/1972 | Albert | 414/469 |
| 3,786,950 | 1/1974 | Zemien | 414/483 |
| 3,788,675 | 1/1974 | Wilander | 280/43.11 |
| 3,810,530 | 5/1974 | Jay | 188/32 |
| 3,837,665 | 9/1974 | Schramm . | |
| 4,673,328 | 6/1987 | Shiels | 414/471 |
| 4,685,855 | 8/1987 | Celli | 414/482 |
| 4,902,188 | 2/1990 | Page | 414/495 |
| 4,917,219 | 4/1990 | Henry | 188/32 |
| 5,056,977 | 10/1991 | May | 414/12 |
| 5,474,416 | 12/1995 | Rogge et al. | 414/482 |
| 5,924,836 | 7/1999 | Kelly | 414/482 |
| 5,941,542 | 8/1999 | Kalman | 280/38 |

FOREIGN PATENT DOCUMENTS

| | | | |
|---|---|---|---|
| 1695676 | 2/1978 | Australia . | |
| 2754009A1 | 6/1978 | Germany | 414/495 |
| 463975 | 11/1968 | Switzerland . | |
| 1500502 | 2/1978 | United Kingdom . | |
| 86/3168 | 6/1986 | WIPO . | |

*Primary Examiner*—Brian L. Johnson
*Assistant Examiner*—Bridget Avery

[57] ABSTRACT

The present invention is related to a transport trailer with a suspended articulated platform. The device comprises a platform (1) upon which is pivotally attached a cradle formed of two interdependent arms (6) of a shaft spanning the platform transversely near the longitudinal center of the platform. The fore arms (P'2) are pivotally connected at (P2–P'2). The top of each arm is linked to a fork made up of two tie-beams (2) and a T-shaped tow bar (3). These tie-beams are pivotally connected at (P3–P'3) and (P4–P'4). The hitch device (4) is linked to the hauling vehicle, which, in moving forward, exerts a force (F). This towing force results in the raising of the platform (1) so that it pivots around (P1–P'1) and (P2–P'2). This rotation takes place around the wheel shafts (5) so that they become locked in with the aid of the wedges (10). In the upright position, as shown, the tie-beams (2) are locked against the fore arms (6) at points (S) and (S').

15 Claims, 6 Drawing Sheets

MULTI-PURPOSE JOINTED SUSPENDED-BED TRANSPORT TRAILER

FIELD OF THE INVENTION

The present invention is related to the field of ways and means of transporting "merchandise". The term "merchandise" is to be taken in its broadest sense.

BACKGROUND OF THE INVENTION

The technical aspect of the invention concerns itself with transport platforms which can be hauled by a vehicle. The field of use can encompass roadways, or venues that are ice or snow covered. In the first case wheels are appropriate, in the second, skis or ice blades are used with the aid of an adaptor affixed to the existing tires.

The technical singularity of this principle is that of a platform or floor that is pivotally attached to several shafts allowing for vertical movement either downward into a loading/unloading or upward for a travelling position and vice versa.

This vertical movement is completed without any disturbance of the absolute horizontal position of the floor or platform during the displacement phase. The rotation of the assembly occurs around the shaft of the wheels which are blocked at the bottom with the aid of wedges. The force required to raise the platform is provided by the movement of the hauling vehicle.

The advantage of this trailer having a platform which can be lowered to ground level is the elimination of the need for access ramps or the use of "various machines" (Fork-Lift) to raise the load and place it on the floor of the trailer.

These platform trailers can be used to transport all types of vehicles whether they be recreational (motorcycles, snowmobiles, sea-doos, boats, etc.) or utility vehicles (cars, tractors, lawn mowers, etc.). The platform can be fitted with side rails forming a box which can be used in the transport of bulk cargo or other types of load. The box covered with a roof can be used as a live stock carrier for the transport of animals. The loading is carried out very easily since the difference between the level of the ground and that of the level carrying the load is the thickness of the floor itself.

In the preceding examples the term platform designates a surface or a loading plane permitting the transport of "diverse merchandise". But this platform may also serve as a "machine support" and become part of the "machine" itself. These machines, in their uses, must be carried from one location to another (cranes, generators etc.). As part of their working function, their weight is augmented while they are in use, thereby creating the necessity for a solid base laying on the ground and not on wheels.

It is understood that a number of systems have been developed to eliminate the disadvantage of having a loading surface located near to the shaft level of the trailer. These devices were conceived to be used on the hauling vehicle itself or on the trailer, which in this case, becomes a device that is free of the motorized towing assembly, namely a trailer.

The following patents relate to motorized vehicles having a moveable platform:

U.S. Pat. No. 5,035,462
U.S. Pat. No. 3,707,238
PCT Patent PCT/AU96/00255 publication WO 96/34778
U.S. Pat. No. 4,902,188

The following patents relate to trailers having moveable platforms:

European Patent Application 0683089A
French Patent 9109235
PCT Patent PCT/AU95/00162 publication WO 95/26280
U.S. Pat. No. 4,673,328
U.S. Pat. No. 5,288,197
Canadian Patent 2,146,185

All these patents show to more of less sophisticated devices capable of lowering and raising a towing platform or motorized vehicles. Yet all these patents mention various ways to allow for the movement of an articulated, or not, platform. These methods could be systems employing one or several jacks, mostly hydraulic, but they may also be electric or pneumatic. The obvious disadvantage is the complexity and the cost associated with these systems which considerably increase the cost of the whole. Another disadvantage is the need to put in place a maintenance program for said systems and their complexity increases the risk of breakdowns.

Other means are also shown, such as U.S. Pat. No. 4,673,328 and Canadian patent 2,146,185 which mention the use of guidance assemblies and winching systems. Given that these systems could be less expensive that the preceding systems, they also make the total cost high. Breakdowns can occur especially in the case of those concerning jamming problems which can occur in the guided area as in U.S. Pat. No. 4,673,328. There can also be a risk of premature wear to the cable causing it to break depending on the environment in which the systems are used.

To summarize, if all these devices allow for easy loading of diverse merchandise while having a mobile vertical platform which remains horizontal at all times or having a vertical non horizontal movement at all times, they are more or less difficult to achieve and therefore expensive.

The solution to all these problems is addressed by the present invention. This consists of a platform furnished with an aft cradle and two fore arms pivotally attached to external longitudinal beams of said platform. The aft cradle constitutes a solid transverse shaft with two vertical arms. The aft cradle arms each supporting at least one spindle with an axle and its wheel. A ski or skate can be fixed to said wheel with the aid of an adjustable strap embracing the circumference of the tire of the wheel. The top of each arm has a joint which allows for the linking of said arms, two by two, in a longitudinal manner. Their joining is achieved by an articulated fork composed of two tie beams linked together by a T-shaped tow bar. This tow bar can be fitted with a device allowing for height adjustment of the hitching point of the head of the assembly which hooks itself to the towing bracket of the hauling vehicle.

The platform rests on the ground, the wheels or skis are immobilized with the aid of wedges, the tow bar and its hitch device are attached to the towing bracket of the vehicle. The vehicle, as it moves forward, allows for the raising of the platform; in effect the assembly pivots around the shaft of the wheels which are immobilised. The fore arms keep the platform horizontal during the vertical movement. When the platform reaches its final upper position the hauling vehicle is immobilised; one can then, with the help of various methods, secure the two tie beams on their respective fore arms. As the trailer is then in a travelling position, we can now remove the wedges.

The advantage of the present invention over other used systems cited in previous patents lies in the use of the hauling vehicle motor towing force which allows for the raising of the platform. This advantage eliminates the use of an external system to produce this towing force as well as reducing the complexity of the operation. This articulated platform is easy to achieve and its use is simple and rapid, which is also an advantage not to be overlooked.

When the platform rests on the ground, the wheel is slightly above ground level, thus permitting the replacement of a flat tire without the use of jacks. It is also possible to slide the skate between the wheel and the ground and to strap it around the tire.

The following description and drawings represent examples of usage but are in no way limited as such. Different types of platforms can be used; we can also use individual muscular force applied against the end of the tow bar to raise the platform. These are different embodiments described in the following examples.

SUMMARY OF THE INVENTION

The present invention provides a trailer to be towed by a vehicle, comprising a platform having sides and a front and a rear end, a beam and parallel links on each side of said platform, said links pivoted to said platform and to said beam by a first and a second pivotal connection respectively, said links, beam and platform forming a deformable parallelogram on each side of said platform, said beam and platform being parallel, a ground engaging member on each side of said platform for supportive the latter above ground, said members pivotally connected to one of said links by a third pivotal connection spaced from said first pivotal connection, a tow bar protruding from said front end and rigidly joined to said beams, a hitch device at the free end of said tow bar for hitching said trailer to a towing vehicle said platform resting on the ground in a loading/unloading position with said third pivotal connection above said platform, a towing force exerted on said tow bar, while said ground engaging members are stopped, causing forward movement of said third pivotal connections whereby said platform is elevated off the ground to a travelling position, and a locking device to releasable lock said platform in said travelling position.

Preferably, the ground engaging members are tire wheels.

Preferably, the tire wheels take a raised position off the ground in the loading/unloading position of said platform.

Preferably, the parallel links are in respective transverse register relative to said platform and further including a cross shaft journalled in and transverse to said platform and rigidly interconnecting one pair of transversely registering links, said cross shaft forming said first pivotal connection.

Alternatively, the trailer further includes a skate and strap releasably secured to said skate, surrounding and tensioned around said tire wheel.

Preferably, the platform has ground engaging rollers and load engaging rollers protruding form the underface and from the top face of said platform respectively.

Preferably, the trailer further includes a double wedge to stop said tire wheels, comprising a block with opposite concave, tire fitting surfaces and a ground facing surface defined by two sections below said respective concave surfaces, spike protruding from one of said sections and a rubber layer covering and adhered to the other one of said sections.

Preferably, the trailer further includes a skate holding spiked member pivoted to one end of said skate between a lowered snow or ice gripping position an elevated snow or ice clearing position.

Preferably, the platform further has ground engaging rollers and load engaging rollers protruding form the underface and from the top face of said platform respectively.

BRIEF DESCRIPTION OF THE DRAWINGS

In the annexed drawings, like reference characters indicate like elements throughout.

DETAILED DESCRIPTION OF THE PREFERRED EMBODIMENT

The invention will be described in greater detail in explaining the existing relationships between the different pieces or groups of pieces constituting the platform assembly.

The wheels and the platform being positioned on the ground, the round level serves as a reference. In the present description we will call those arts most distant from ground level "upper" or "superior"; elements closer to round level will be called "lower" or "inferior".

The towing hitch is the foremost element of the trailer and also serves as a reference. In the description which follows we will call "fore" the elements the closest to the said towing hitch 4, and the elements the furthest from this part "rear". The hauling vehicle towing the trailer in a forward manner, the terms left and right corresponding respectively to the driver side and passenger side for vehicles driven on the left hand side.

In referring to FIGS. 1, 2, 3 and 4, the trailer comprises a platform 1 onto which are pivotally attached the aft cradle A and the fore arms 6'. The aft cradle A consists of a shaft 7 serving as an articulated spindle through P1 and P'1. These articulations are located near the middle of the external side members 9 of the platform 1. The pivot point P1 is located on the right side member and the pivot point P'1 on the left side member. The shaft or spindle 7 transversely crossing the platform 1, is interdependent of each side of the two vertical arms 6 thus forming the cradle A. Each of these arms supports on its exterior side at least one spindle 8 with its axle on which is attached a wheel 5.

The fore arms 6' are pivotally attached through P2 and P'2. They can be disassembled. These two pivots P2 and P'2 are located on the external side members 9 of the platform 1 in its foreside along an extension of the pivots P1 and P'1.

The pivotally attached fork C (FIG. 5) forms the link between the four arms 6 and 6' and the hauling vehicle. This fork C is made up of two tie beams 2 linked to each other at the front by a T-shaped tow bar 3. This tow bar 3 can be provided with a vertically adjustable beam with a towing hitch 4 at its frontal extremity.

Figure 5:
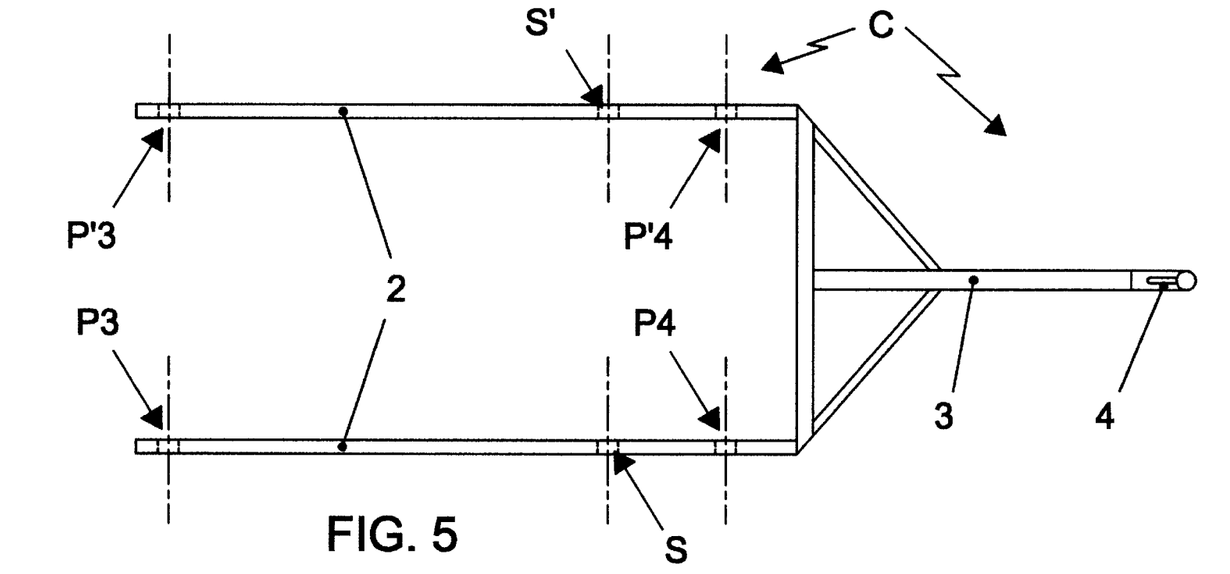
FIG. 5 shows a plan view of the fork.

The right tie beam 2 is pivotally attached at points P3 and P4 corresponding to the upper parts of the right arms 6 and 6' respectively. The left tie beam 2, is pivotally attached joined at points P'3 and P'4 corresponding to the upper parts of the left arms 6 and 6' respectively. The distances P1-P2, P'1–P'2, P3–P4, and P'3–P'4 are equals.

Figure 1:
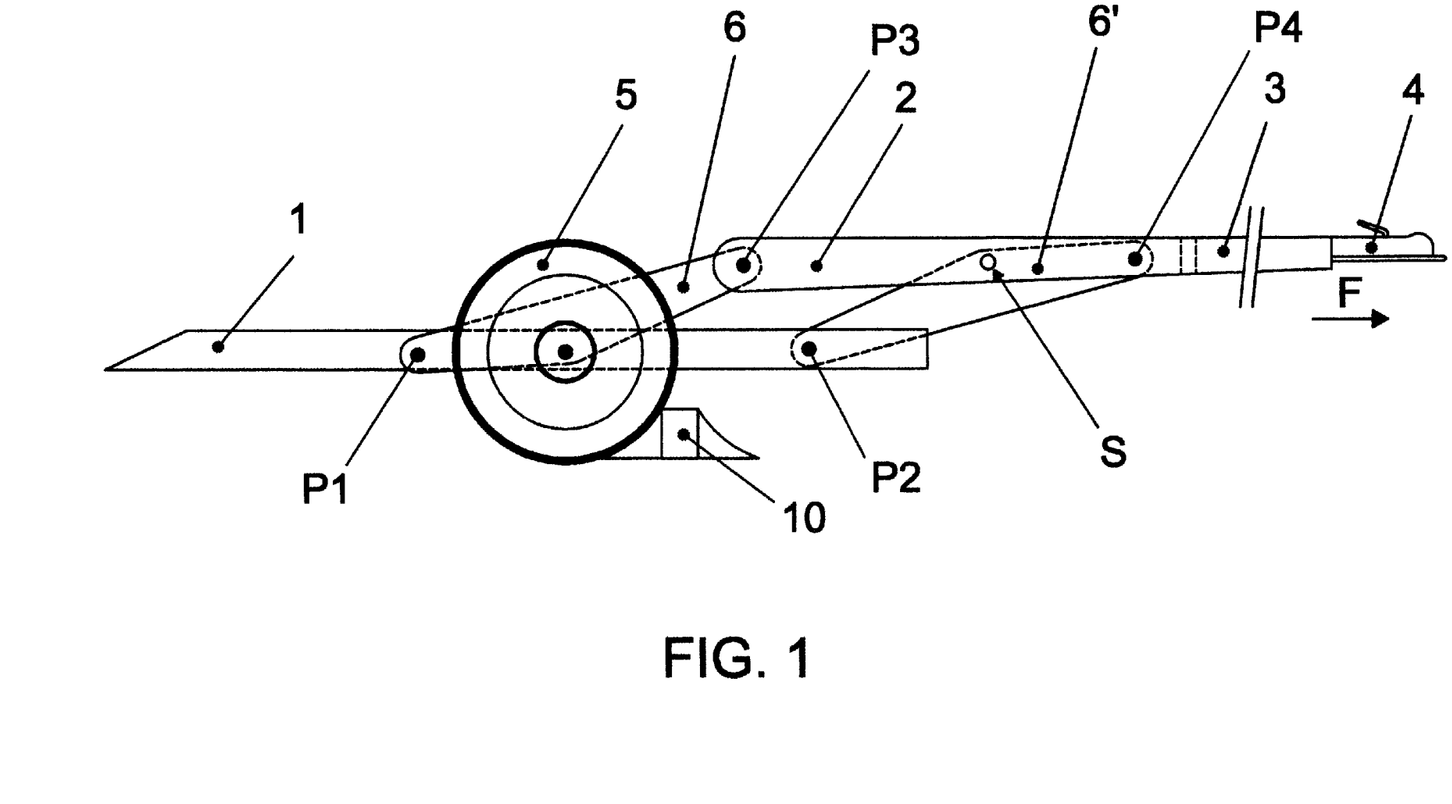
FIG. 1 is a side view of the preferred embodiment of a trailer of the present invention in the raised position.
Figure 2:
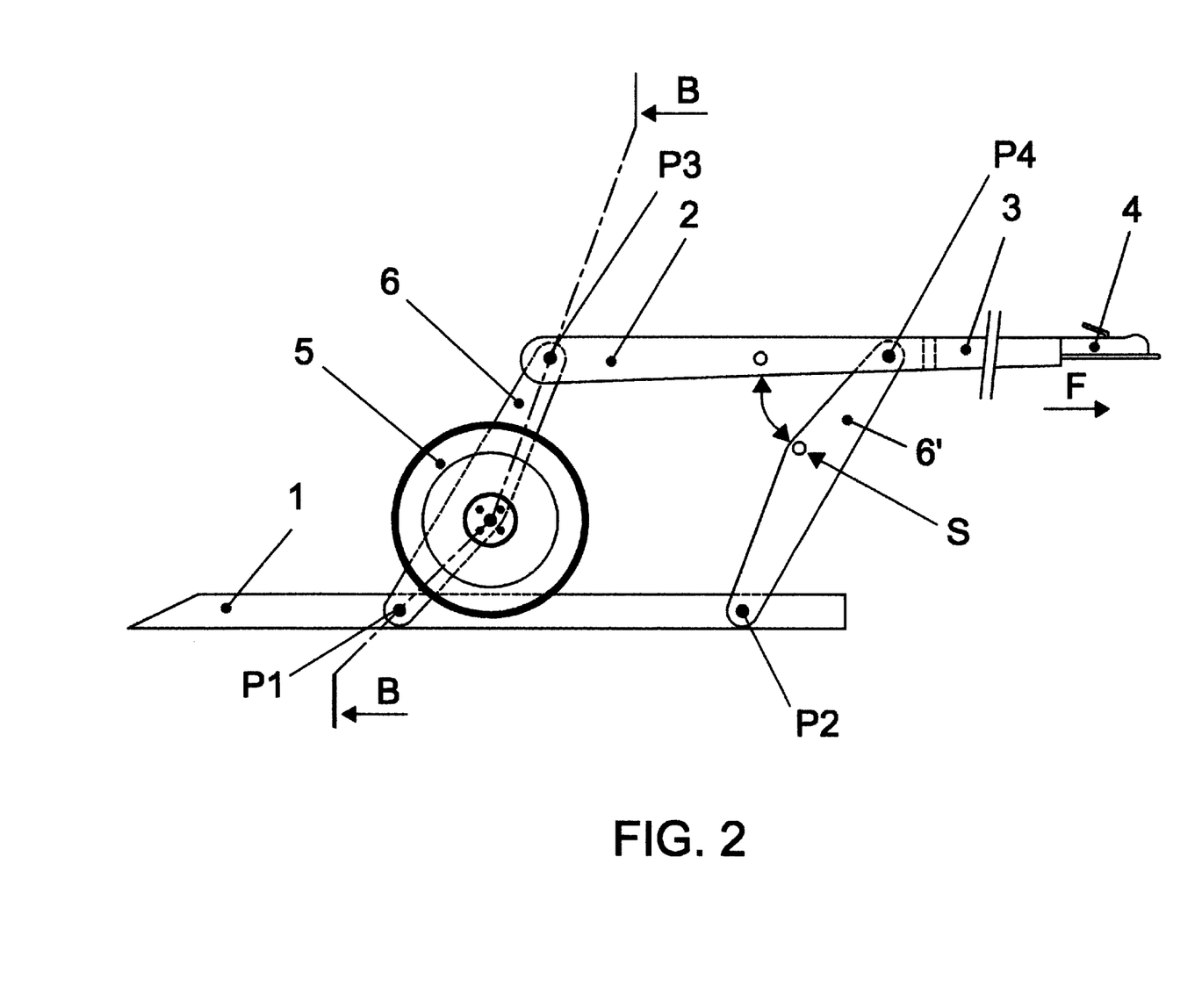
FIG. 2 is a side view of the trailer in the lowered position.

The wheels 5 and the platform 1 are at ground level, the towing hitch 4 is attached to the towing bracket of the hauling vehicle; the assembly is then in said lower position for loading/unloading. To go to the raised position for travelling, each wheel is blocked using a wedge 10. The vehicle moves in a forward direction applying a horizontal force F on the hitch device and the fork C. The arms 6 of the aft cradle A around the spindles 8 and the wheels 5. The platform 1 raises vertically with the aid of articulations P1–p'1 and P2–P'2. The forces pulling at the articulation levels P3–P'3 and P4–P'4, on the upper part of the arms 6 and 6' with the aid of the towing force of the hauling vehicle on the fork and its tow bar, allow for the rotation of the cradle A and the arms 6'; thus the raising of the load to be carried. The platform 1 thus being suspended, the vehicle being immobilized, we now block by various means the fore arms 6' with tie beams 2 at points S and S'. We can now remove the wedges 10.

Figures 3, 4:
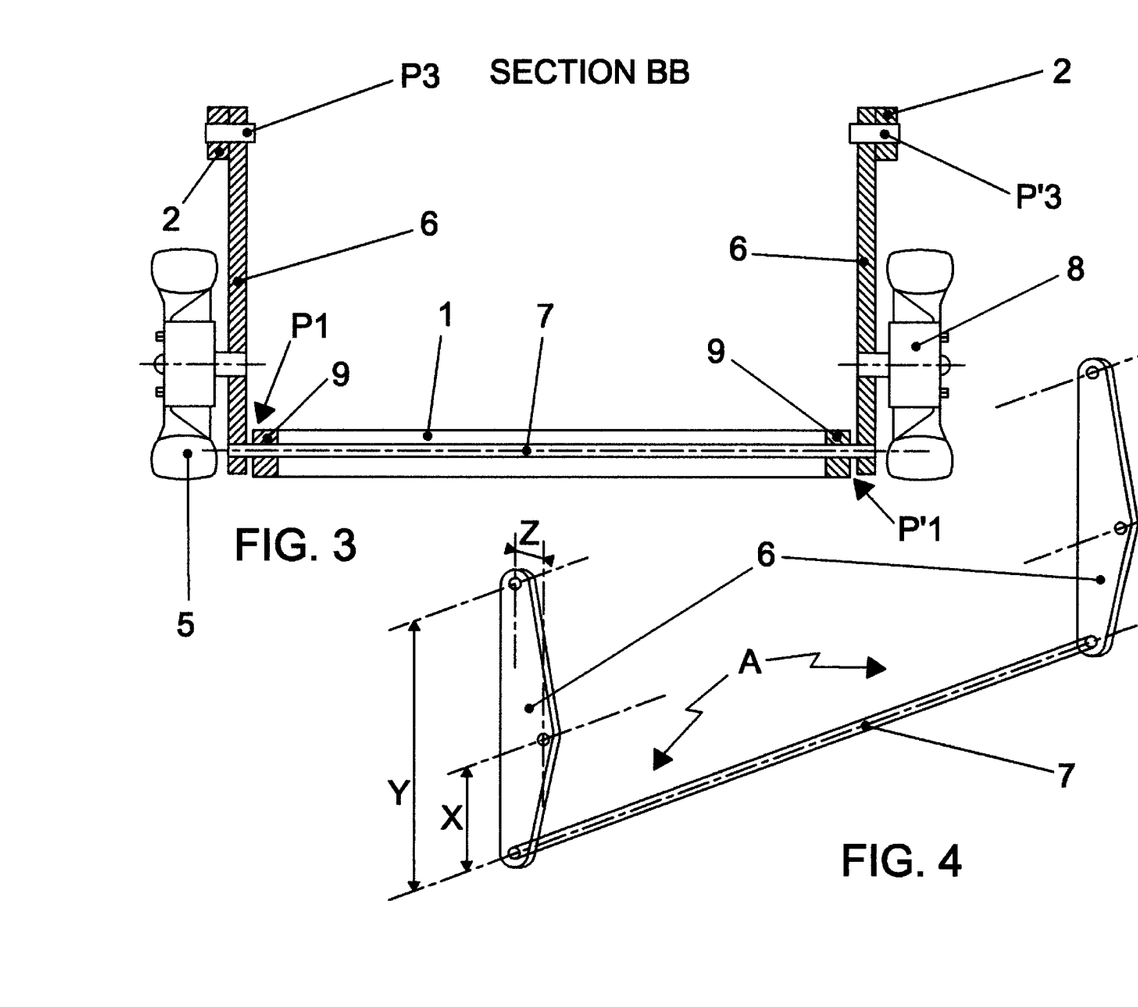
FIG. 3 is a cross sectional view along line B/B of FIG. 2.
FIG. 4 shows the aft cradle.
Figure 9:
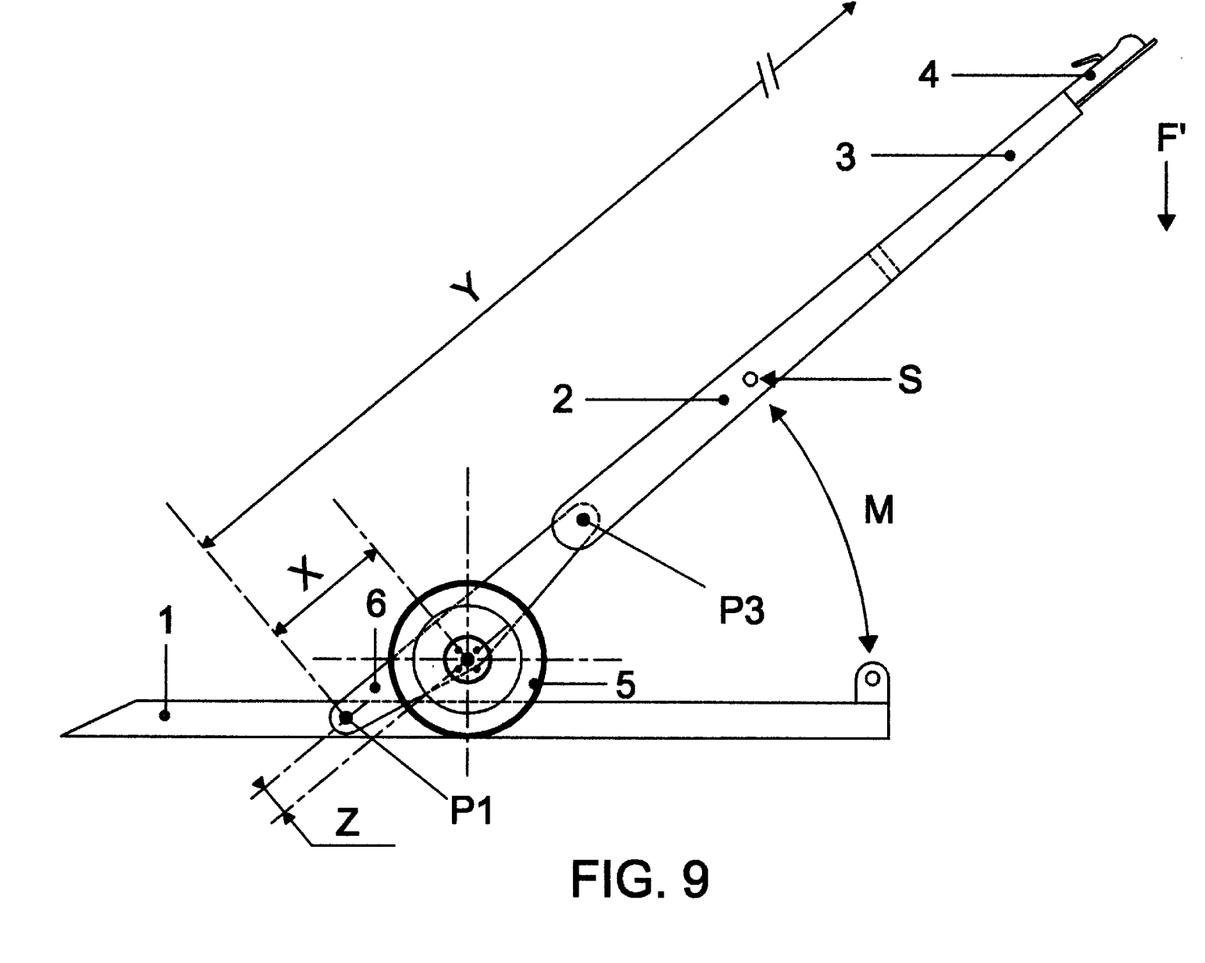
FIG. 9 shows another embodiment of the trailer of the present invention.

In FIGS. 4 and 9 we see the existing relationship between the position of the axis of the wheel spindle and the various articulation points. The dimension Z determines the ground clearance of the platform 1 in the raised position. The ratio of X over Y along with the offset Z of the wheel 5 determines the amount of effort needed to raise the platform 1. The dimension X is at least equal to the radius of the wheel 5.

Figure 7:
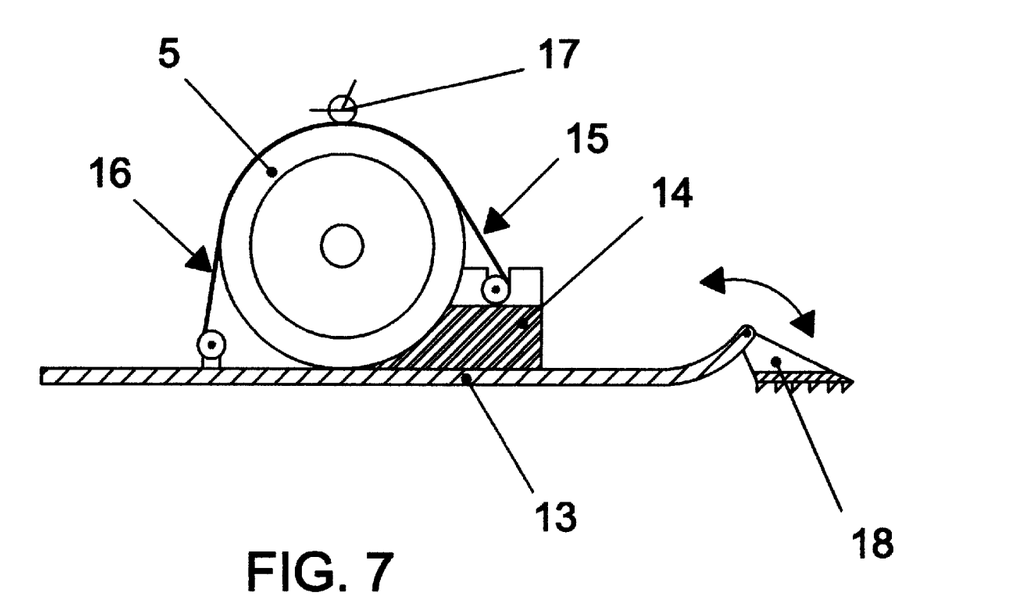
FIG. 7 is a side view of a wheel and a skate adaptor affixed to it.

FIG. 7 represents a system of attaching a skate or ski 13 to the wheel 5. It is composed of a fore-abutment 14 hugging the shape of the wheel, on this abutment 14 a shaft permits attachment of a semi fore-strap with a tension system 17. The semi rear-strap 16 is attached to the skate 13 with the aid of a shaft secured at the back of the tire. The tension system 17 secures the skate-strap assembly to the wheel. The spiked moveable wedge 18 is pivotally attached to the top of the front curved portion of the skate, it serves to hold down the skate in position on snow or ice.

Figure 8:
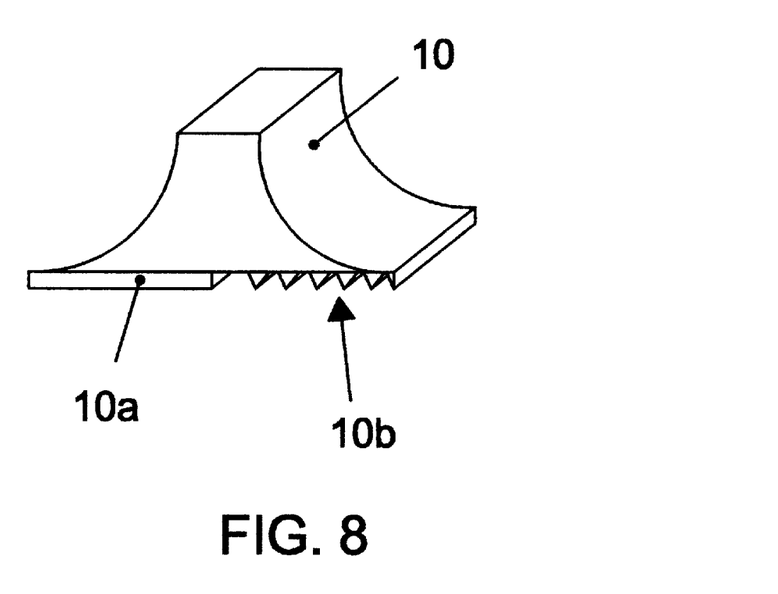
FIG. 8 is a top perspective view of a double wedge.

FIG. 8 represents a type of double wedge which can be used to block wheels. Half of the underside of the wedge 10 is rubber coated 10a to block wheels on relatively smooth and hard surfaces. The other half 10b is spiked for use on softer surfaces.

Figure 6:
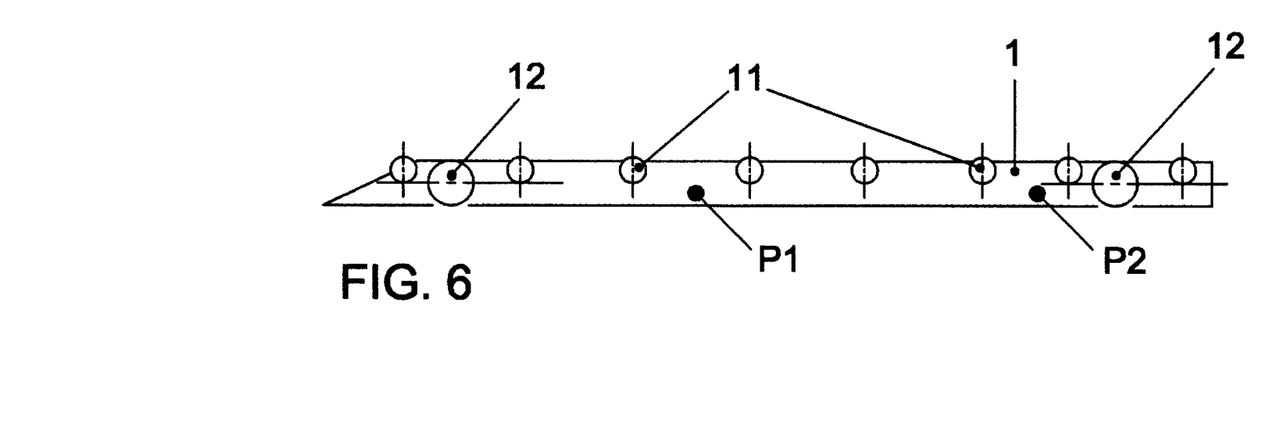
FIG. 6 shows a floor with ground- and load-engaging rollers.

A roller floor can be used instead of a platform 1 as shown in FIG. 6. The upper rollers 11 allow for the cargo to roll on the platform. The lower rollers 12 allow for the platform 1 to roll on the ground when the vehicle is moving backwards. In using the power of the vehicle, the platform can slide under a load to facilitate handling due to the upper rollers 11.

FIG. 9 represents another way of using a moveable platform. The fore arms 6' being disassembled, the tie beams 2 of the fork C are pinned at points P3 and P'3 in the extension of arms 6 of the aft cradle A. Muscular force F' applied against the towing hitch 4 allows for a cantilevered movement M. This results in the raising of the rear of the platform. The tie beams 2 of the fork C are then blocked at points S and S' to the front of the platform 1. We can then lift the assembly, comprised of the platform 1 and the fork C, by the tow bar to attach it to the hauling vehicle. This configuration can be used for platforms having a lower load capacity. The necessary force F' is also determined in this case by the relationship between the dimensions X with respect to Y and to a lesser degree Z.

What is claimed is:

1. A trailer to be towed by a vehicle, comprising a platform having sides and a front and a rear end, a beam and parallel links on each side of said platform, said links pivoted to said platform and to said beam by a first and a second pivotal connection respectively, said links, beam and platform forming a deformable parallelogram on each side of said platform, said beam and platform being parallel, a ground engaging member on each side of said platform for supporting the latter above ground, said members pivotally connected to one of said links by a third pivotal connection spaced from said first pivotal connection, a tow bar protruding from said front end and rigidly joined to said beams, a hitch device at the free end of said tow bar for hitching said trailer to a towing vehicle, said platform resting on the ground in a loading/unloading position with said third pivotal connection above said platform, a towing force exerted on said tow bar, while said ground engaging members are stopped, causing forward movement of said third pivotal connections whereby said platform is elevated off the ground to a travelling position, and a locking device to releasable lock said platform in said travelling position.

2. A trailer as defined in claim 1, wherein said ground engaging members are tire wheels.

3. A trailer as defined in claim 2 wherein said tire wheels take a raised position off the ground in the loading/unloading position of said platform.

4. A trailer as defined in claim 1 wherein said parallel links are in respective transverse register relative to said platform and further including a cross shaft journalled in and transverse to said platform and rigidly interconnecting one pair of transversely registering links, said cross shaft forming said first pivotal connection.

5. A trailer as defined in claim 2 further including a skate and strap releasably secured to said skate, surrounding and tensioned around said tire wheel.

6. A trailer as defined in claim 1, wherein said platform has ground engaging rollers and load engaging rollers protruding form the underface and from the top face of said platform respectively.

7. A trailer as defined in claim 2, further including a double wedge to stop said tire wheels, comprising a block with opposite concave, tire fitting surfaces and a ground facing surface defined by two sections below said respective concave surfaces, spike protruding from one of said sections and a rubber layer covering and adhered to the other one of said sections.

8. A trailer as defined in claim 5, further including a skate holding spiked member pivoted to one end of said skate between a lowered snow or ice gripping position an elevated snow or ice clearing position.

9. A trailer as defined in claim 3, wherein said parallel links are in respective transverse register relative to said platform and further including a cross shaft journalled in and transverse to said platform and rigidly interconnecting one pair of transversely registering links, said cross shaft forming said first pivotal connection.

10. A trailer as defined in claim 9, further including a skate and strap releasably secured to said skate, surrounding and tensioned around said tire wheel.

11. A trailer as defined in claim 10, further said platform has ground engaging rollers and load engaging rollers protruding form the underface and from the top face of said platform respectively.

12. A trailer as defined in claim 4, further including a double wedge to stop said tire wheels, comprising a block with opposite concave, tire fitting surfaces and a ground facing surface defined by two sections below said respective concave surfaces, spike protruding from one of said sections and a rubber layer covering and adhered to the other one of said sections.

13. A trailer as defined in claim 4, wherein said platform has ground engaging rollers and load engaging rollers protruding form the underface and from the top face of said platform respectively.

14. A trailer as defined in claim 11, further including a double wedge to stop said tire wheels, comprising a block with opposite concave, tire fitting surfaces and a ground facing surface defined by two sections below said respective concave surfaces, spike protruding from one of said sections and a rubber layer covering and adhered to the other one of said sections.

15. A trailer as defined in claim 14, wherein said platform has ground engaging rollers and load engaging rollers protruding form the underface and from the top face of said platform respectively.

* * * * *